United States Patent [19]

Leiner et al.

[11] Patent Number: 5,412,504
[45] Date of Patent: May 2, 1995

[54] OPTICAL SYSTEM FOR AN ENDOSCOPE

[75] Inventors: Dennis C. Leiner, Dublin, N.H.;
William G. Peck, Rochester, N.Y.

[73] Assignee: United States Surgical Corporation, Norwalk, Conn.

[21] Appl. No.: 132,007

[22] Filed: Oct. 5, 1993

[51] Int. Cl.⁶ .............................................. G02B 23/00
[52] U.S. Cl. ...................................... 359/434; 359/435
[58] Field of Search ................ 359/656, 708, 434, 435

[56] References Cited

U.S. PATENT DOCUMENTS

| | | | |
|---|---|---|---|
| 3,089,484 | 5/1963 | Hett | 128/6 |
| 3,257,902 | 6/1966 | Hopkins | 128/6 |
| 3,297,022 | 1/1967 | Wallace | 128/6 |
| 3,556,085 | 1/1971 | Takahashi | 128/6 |
| 4,025,155 | 5/1977 | Imai | 359/737 |
| 4,036,218 | 7/1977 | Yamashita et al. | 128/4 |
| 4,148,550 | 4/1979 | MacAnally | 359/737 |
| 4,148,551 | 4/1979 | MacAnally | 359/737 |
| 4,168,882 | 9/1979 | Hopkins | 359/776 |
| 4,267,828 | 5/1981 | Matsuo | 128/6 |
| 4,273,110 | 6/1981 | Groux | 128/6 |
| 4,300,812 | 11/1981 | Nakahashi | 359/432 |
| 4,354,730 | 10/1982 | Bel | 359/737 |
| 4,385,810 | 5/1983 | Hamou | 359/381 |
| 4,545,652 | 10/1985 | Hoogland | 359/708 |
| 4,575,195 | 3/1986 | Hoogland | 359/708 |
| 4,664,486 | 5/1987 | Landre et al. | 359/676 |
| 4,676,606 | 6/1987 | Takahashi | 359/435 |
| 4,693,568 | 9/1987 | Takahashi | 359/435 |
| 4,704,007 | 11/1987 | Landre et al. | 128/6 |
| 4,723,843 | 2/1988 | Zobel | 359/737 |
| 4,784,118 | 11/1988 | Fantone et al. | 128/6 |
| 4,919,112 | 4/1990 | Siegmund | 128/4 |
| 4,946,267 | 8/1990 | Hoogland | 359/737 |
| 4,964,710 | 10/1990 | Leiner | 128/6 |
| 4,993,817 | 2/1991 | Hoogland | 359/708 |
| 5,005,960 | 4/1991 | Heimbeck | 359/737 |
| 5,020,893 | 6/1991 | Karst et al. | 359/435 |
| 5,188,092 | 2/1993 | White | 128/4 |

FOREIGN PATENT DOCUMENTS

| | | |
|---|---|---|
| 3838168 | 10/1988 | Germany . |
| 544422 | 1/1977 | U.S.S.R. . |
| 683721 | 9/1979 | U.S.S.R. . |
| 686725 | 9/1979 | U.S.S.R. . |

OTHER PUBLICATIONS

Warren J. Smith, Modern Optical Engineering, pp. 159, 160 (1966).
The Handbook of Plastic Optics, 2nd Edition, pp. 56–93 (1983).

*Primary Examiner*—Scott J. Sugarman

[57] ABSTRACT

An optical system to be incorporated in endoscopic instrumentation is provided. The optical system includes objective lens, relay lens and eye lens assemblies. The objective and eye lens assemblies are comprised of a plurality of axially aligned polymeric lenses. The relay lens assembly includes at least one relay lens module for transferring an image between successive image planes. The relay lens module consists of two identical optical assemblies arranged in bilateral symmetrical relation relative to a median plane. Each optical assembly includes a glass plano cylinder and polymeric curved lenses. The physical and geometrical characteristics of the components are selected to effectively transfer a bright image to the viewer.

14 Claims, 7 Drawing Sheets

OPTICAL SYSTEM FOR AN ENDOSCOPE

BACKGROUND OF THE INVENTION

1. Field of the Invention

This invention relates generally to optical systems and, in particular, to an optical system for a disposable rigid endoscope.

2. Discussion of the Prior Art

Endoscopes are optical instruments which permit the examination of body cavities without the need for extensive surgery. Conventional rigid endoscopes typically include a pipe for illuminating a region of the body cavity to be viewed and an optical lens system mounted in a tube for focusing and relaying the illuminated image from inside the body cavity to the physician. Essential optical components of a conventional lens system include a front combination of lenses constituting the objective lens, a system of relay lenses to carry the image through the scope, and an eye lens which produces a magnified virtual image for the viewer. Examples of such optical systems for endoscopes are described in U.S. Pat. Nos. 3,089,484 to Hett, 3,257,902 to Hopkins, 3,556,085 to Takahashi, 4,036,218 to Yamashita, 4,267,828 to Matsuo and 4,273,110 to Groux.

There are several drawbacks in the endoscopes of the prior art, specifically with regard to the complexity and expense of the optical systems incorporated therein. The optical components are typically made of glass that is ground and polished by expensive manufacturing techniques. As a result, the cost of these instruments is relatively high which thereby precludes disposing of the instrument after each surgery. It has become increasingly important to dispose of these instruments after each surgery to eliminate the risk of exposing the next patient to diseases such as AIDS or hepatitis. While most surgical instruments can be sterilized with high pressure steam, the delicate nature of optical systems in endoscopes makes such sterilization difficult. Also, since most of these instruments are inherently fragile, they are frequently broken, at great expense to the user.

In an effort to reduce the cost and complexity of the prior art systems, U.S. Pat. No. 4,784,118 to Fantone describes an endoscope in which the light pipe, and the objective, relay, and viewing lens assemblies are all made of polymeric materials, such as acrylics, polystyrenes, polycarbonates and styrene-acrylonitrile (SAN) copolymers, by conventional injection molding techniques.

Although the Fantone device offers some advantages over prior art optical systems, the device has several drawbacks. The polymeric relay lenses are composed of only one material which increases the chromatic aberration of the image and reduces the resolution. In addition, in order to obtain a bright image, the polymeric lenses have to be manufactured such that the length to diameter ratios of the lenses is relatively high. This is very difficult to achieve using currently known manufacturing techniques.

U.S. Pat. No. 4,964,710 to Leiner discloses a unique hybrid relay lens system that overcomes the problems with the Fantone endoscope and the other aforementioned prior art. This relay lens system incorporates glass plano cylinders disposed between molded polymeric curved surface lenses which have a thickness on the same order of magnitude as their diameter. The polymeric lenses are preferably fabricated from two different polymers to allow for the correction of chromatic aberration. In order to achieve a bright image, the plano glass cylinders with flat polished end faces are placed in between the polymeric lenses. In contrast to ground and polished lenses, the plano glass cylinders can be economically made in large quantities, while the smaller polymeric lenses can be economically and accurately made by known injection molding processes.

Despite the teachings of the prior art it remains desirable to provide an endoscope which is efficient and reliable to manufacture and which provides a clearer and brighter image while enhancing resolution. The present invention relates to a device which achieves these objectives by providing an improved optical system to be incorporated in a disposable rigid endoscope.

SUMMARY OF THE INVENTION

According to the present invention, an optical system using a combination of polished glass and molded polymeric lenses is provided to be incorporated in a rigid endoscope. The optical system comprises an objective lens assembly, a relay lens assembly and an eye lens assembly.

The objective lens assembly is mounted at the distal end of the endoscope and comprises a plurality of axially aligned lenses. At least one of the lenses of the objective lens assembly is fabricated from an optical polymeric material. The lenses of the objective assembly may be affixed to each other along common end surfaces and are configured to form a focused real image of an object at an image plane prior to relay.

The relay lens assembly comprises at least one relay lens module for relaying an image between successive image planes within the endoscope. The lens module comprises two identical optical assemblies which are arranged in bilateral symmetrical relation relative to a median plane disposed between the two assemblies. Each optical assembly comprises a glass plano cylinder having first and second polished end surfaces. First and second curved lenses are positioned adjacent the first and second end surfaces of the plano cylinder respectively. In the preferred embodiment, the relay lens assembly comprises a plurality of identical lens modules aligned along a common axis within the endoscope. The geometrical and physical characteristics of each module are selected to effectively transfer a bright image of an object to a successive image plane while also allowing for the correction of image aberrations.

The eye lens assembly of the optical system is mounted at the proximal end of the endoscope and produces a magnified virtual image of the relayed image for viewing by the observer. The eye lens assembly comprises at least one curved lens, preferably, a doublet lens, which is formed from different polymeric materials.

BRIEF DESCRIPTION OF THE DRAWINGS

The accompanying drawings, referred to herein and constituting a part hereof, illustrate preferred embodiments of the present invention and together with the description, serve to explain the principles of the present invention, wherein.

DETAILED DESCRIPTION OF THE PREFERRED EMBODIMENTS

Figure 1:
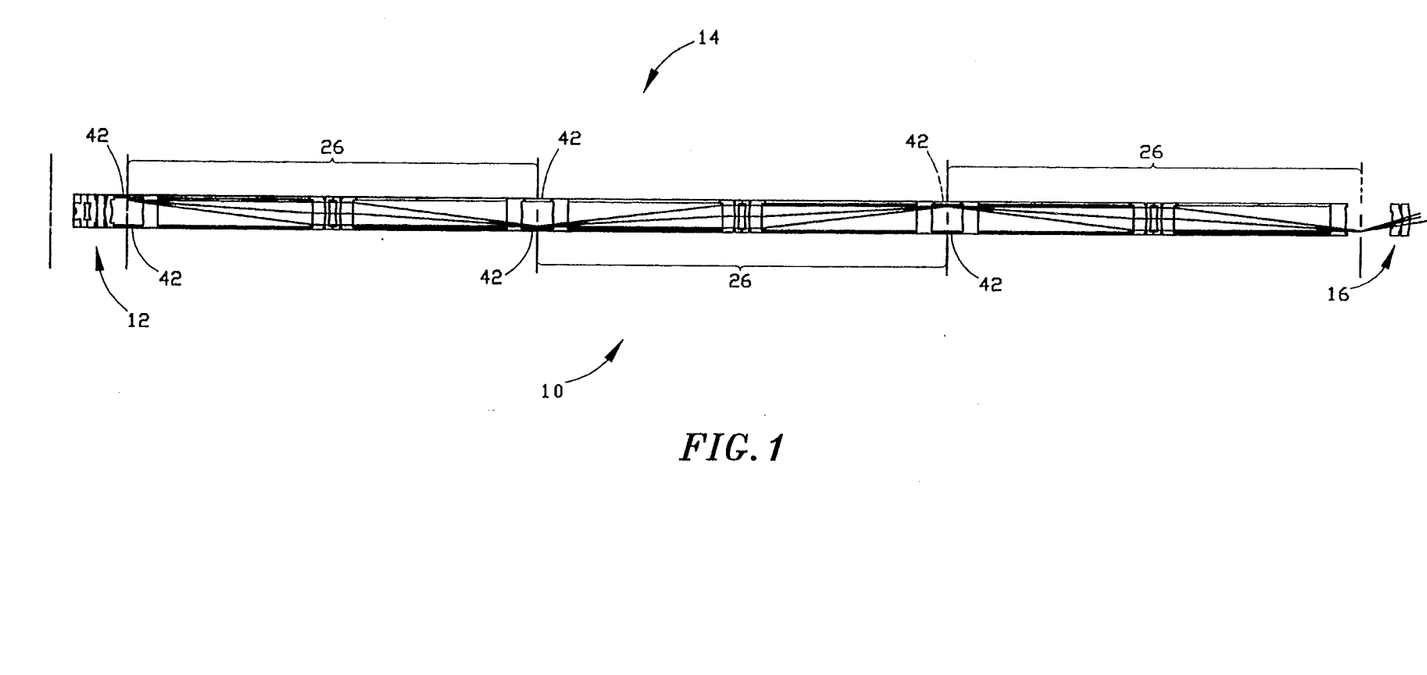
FIG. 1 is an optical schematic of an endoscopic optical system of the present invention and illustrates ray path and image orientation.

Referring now to the drawings and, in particular, to FIG. 1, there is shown a schematic of the endoscopic optical system of the present invention. Optical system 10 includes an objective lens assembly 12 for forming an image of an object at an entrance image plane, a relay lens assembly 14 for transferring the image formed at the entrance image plane through the instrument and to an exit image plane and an eye lens assembly 16 for producing a magnified virtual image for the viewer. Optical system 10 finds particular application in disposable endoscopes and can be mounted within an endoscopic tube(not shown) by conventional methods.

Figure 2A:
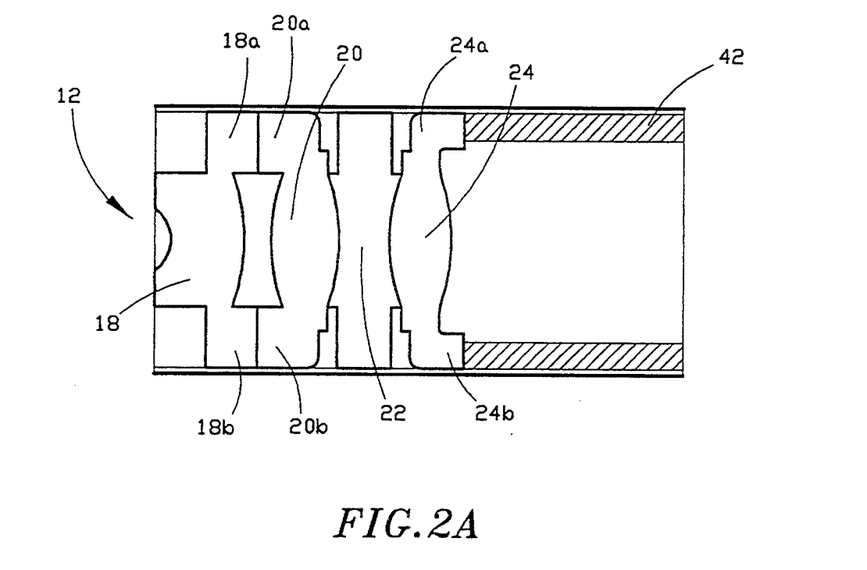
FIG. 2A is an enlarged optical schematic of an objective lens assembly of the optical system of FIG. 1.
Figure 2B:
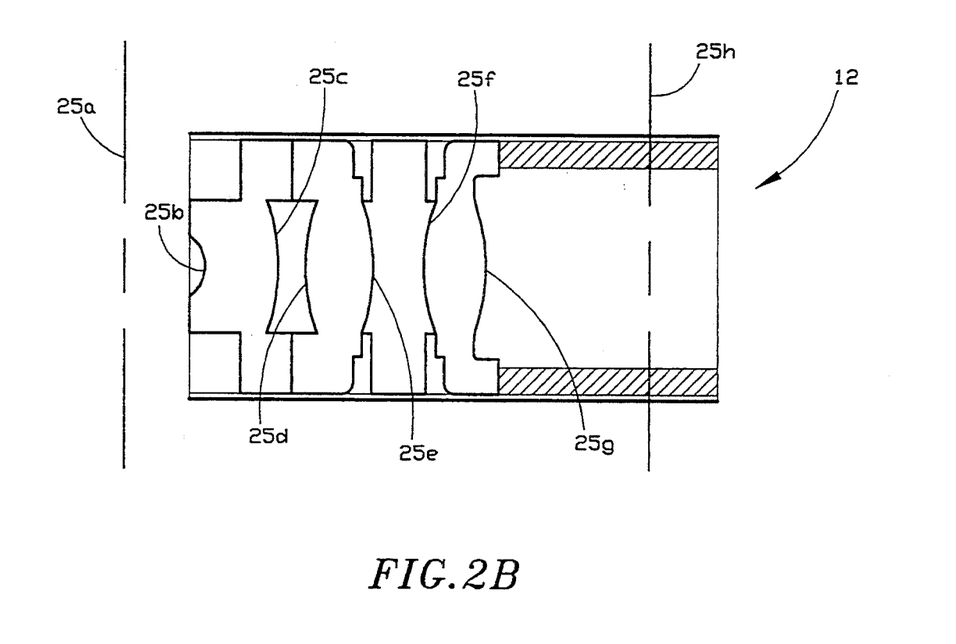
FIG. 2B is an enlarged optical schematic defining the object plane, lens surfaces, and exit image plane of the objective lens assembly of FIG. 2A.

Referring now to FIGS. 2A and 2B, the objective lens assembly of optical system 10 is illustrated in detail. Objective lens assembly 12 includes a plurality of curved polymeric lenses 18, 20, 22 and 24 which are in axial alignment with each other and with the remaining components in the optical system. The objective lenses are geometrically configured to transfer an inverted image of an illuminated object from the object plane to an initial or entrance image plane prior to relay.

Each lens of objective assembly 12 is preferably fabricated from a polymeric material, such as an acrylic, polystyrene, polycarbonate or copolymer styreneacrylonitrile (SAN) and is formed by known injection molding techniques. Such techniques are capable of forming precise lenses, relatively inexpensively and in great volume. It is also within the scope of the present invention to manufacture the lenses in objective assembly 12 from other materials such as glass and crystal. In a preferred embodiment, lenses 20 and 24 are double convex and are each fabricated from an acrylic, while lens 22 is double concave and is fabricated from a polystyrene. An air gap exists between the adjacent surfaces of lenses 18 and 20. Lens 18 is a meniscus(concavo-convex) lens and is disposed at the most distal end of the endoscope. Preferably lens 18 is also formed from an acrylic. The lens surfaces of objective assembly 12 may be coated with a broad band anti-reflection coating to reduce reflection losses at air-lens interfaces.

In a preferred embodiment, the lenses of objective assembly 12 are bonded to each other along adjacent end surfaces to form a single objective unit. It is to be appreciated that the respective lenses of objective assembly 12 are configured to facilitate the attachment of adjacent lenses to each other as well as to ensure proper alignment of the lenses within the assembly. In particular, lens 18 possesses cylindrical flange extensions 18a. Similarly, lens 20 is formed with cylindrical flange extension 20a. During assembly of objective assembly 12, the faces of the flange extensions of respective lenses are aligned by a moderate compressive force at the time that the lenses are secured to the tube to ensure proper axial alignment of the lenses. If desired, the flange extensions may be bonded together. This is an important feature in that it facilitates assembly while ensuring the alignment of the lenses within the objective assembly. The flange dimensions may be varied to accommodate the specific geometrical requirements of the optical system. For example, the thickness of the flange extensions may be increased to thereby increase the size of the air gap between the adjacent lenses. The remaining lenses 22 and 24 in objective assembly 12 may be bonded to each other along adjacent surfaces by conventional adhesive means. A suitable adhesive for securing the flanges and the lens surfaces is Norland 68 manufactured by Norland Products, Inc.

Referring to FIG. 2B, the geometrical characteristics of objective assembly 12 are defined by an object plane 25a, a first surface 25b, a second surface 25c, a third surface 25d, a fourth surface 25e, a fifth surface 25f, a sixth surface 25g and an exit image plane 25h (which corresponds to the entrance image plane for the relay lens assembly 14). The geometrical and optical parameters of the objective lens assembly are recorded in Table 1 below. In the Table, surfaces A, B-G, and H correspond to object plane 25a, surfaces 25b–25g and exit image plane 25h, respectively. Table 1 is as follows:

TABLE 1

| SUR-FACE | RADIUS | THICK-NESS | ME-DIUM | INDEX | ABBE NO. |
| --- | --- | --- | --- | --- | --- |
| A | Object Plane | 25 | Air | 1.000 | |
| B | −1.553 | 2.50 ± .03 | Acrylic | 1.492 | 57.4 |
| C | −2.592 | 0.1 ± .03 | Air | 1.000 | |
| D | 2.978 | 2.5 ± .03 | Acrylic | 1.492 | 57.4 |
| E | −3.738 | 1.0 ± .03 | Polystyrene | 1.590 | 30.9 |
| F | 3.738 | 2.25 ± .03 | Acrylic | 1.492 | 57.4 |
| G | −4.141 | 3.0 ± .03 | Air | 1.000 | |
| H | Image Plane | | | | |

*dimensions are in millimeters

Objective lens assembly 12 produces an inverted image of the object at image plane 25h, which image is subsequently transmitted by relay lens assembly 14.

Referring again to FIG. 1, relay lens assembly 14 includes a plurality of relay lens modules 26, arranged in end to end fashion along a common axis. Each module 26 is identical with regard to the optical components contained therein, and is capable of transferring an image from an image plane at the entrance side of the module to a successive image plane formed on the exit side.

Figure 3:
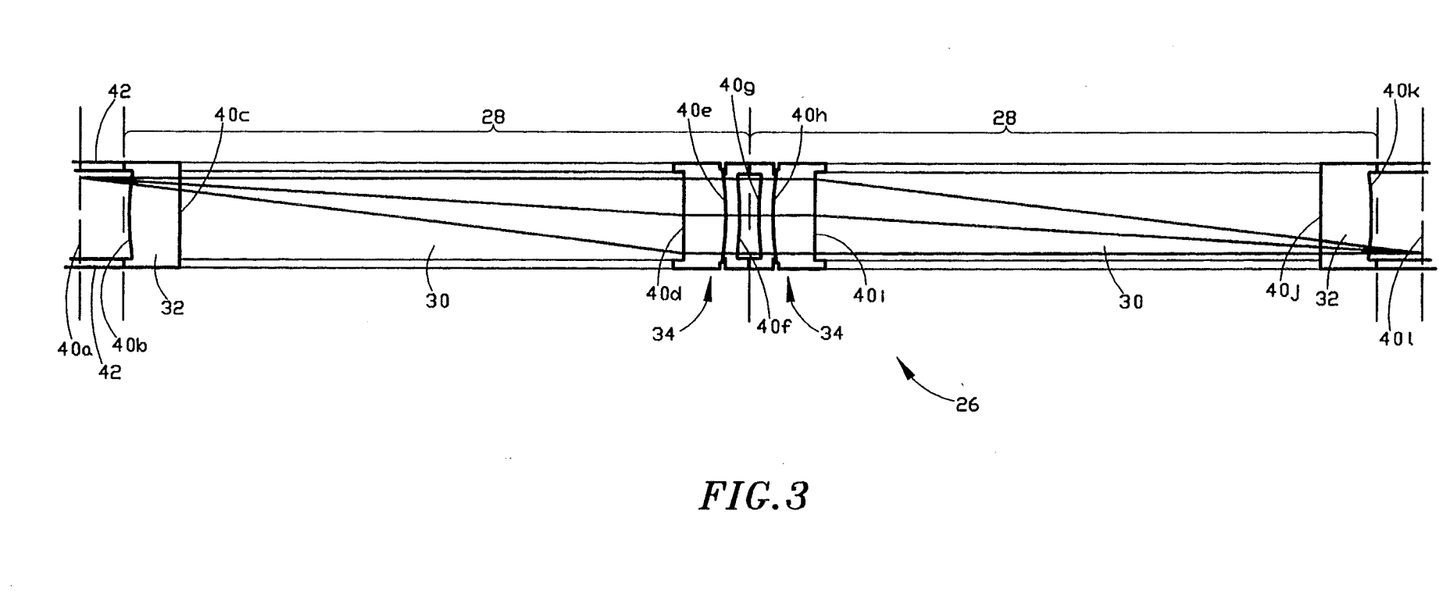
FIG. 3 is an enlarged optical schematic of a single relay lens module of a relay lens assembly of the optical system of FIG. 1 and illustrates ray path and image orientation within the module.

FIG. 3 illustrates the relay lens module 26 of the relay lens assembly in detail. Lens module 26 includes two identical optical assemblies 28 arranged in a symmetrical end to end relationship relative to a median plane disposed between the two assemblies. Assemblies 28 are separated by an air gap. Each component 28 includes a glass plano cylinder 30 having a polished adjacent end face and a polished outer end face relative to the other component in the module. Glass plano cylinder 30 ensures the transfer of a bright image between the modules. Each component 28 further includes single lens 32 and doublet lens 34 bonded to the outer end face and the adjacent end face of plano cylinder 30, respectively.

Figure 4:
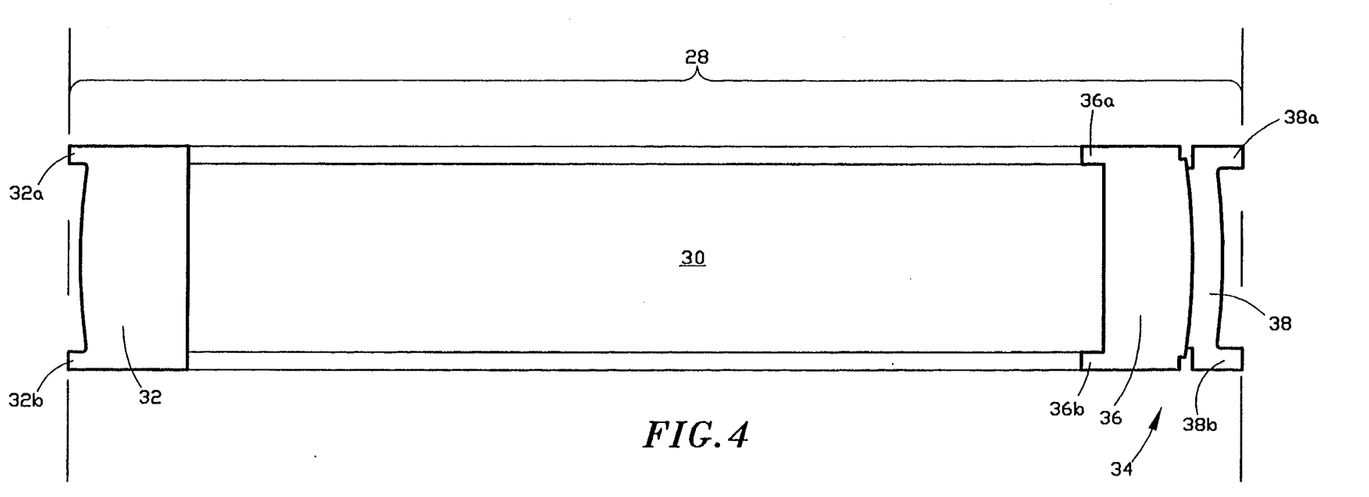
FIG. 4 is an enlarged optical schematic of a single assembly of the single relay lens module of FIG. 3.

As best shown in FIG. 4, single lens 32 is preferably a plano-convex lens with the planar surface being bonded to plano cylinder 30 by conventional adhesive means. The convex surface of lens 32 may be coated with a broad band anti-reflection coating to reduce reflection losses at the air-lens interface. Single lens 32 is fabricated from a polymeric material, such as an acrylic, polystyrene, polycarbonate, or copolymer styrene-acrylonitrile (SAN). In a preferred embodiment, single lens 32 is fabricated from an acrylic. Single lens 32 is preferably formed by conventional injection molding techniques.

Doublet lens 34 consists of two lenses, specifically, first lens element 36 and second lens element 38, bonded to each other along adjacent surfaces to form the doublet. Preferably, first lens element 36 is a plano-convex lens with the planar surface being bonded to the adjacent end face of cylinder 30. Second lens element 38 is preferably a meniscus (concavo-convex) lens. First lens element 36 possesses a cylindrical flange extension 36a which is dimensioned to receive plano cylinder 30 to facilitate alignment and attachment of the cylinder to the doublet. The convex surface of second lens 38 may be coated with a broad band anti-reflection coating. Doublet 34 is preferably fabricated from two different polymeric materials, to allow for the correction of chromatic aberration within the lens system. In a preferred embodiment, lens 36 is formed from an acrylic while lens 38 is formed from either a polycarbonate or a polystyrene. It is to be noted that other combinations of polymeric materials would be apparent to one skilled in the art.

In the optical arrangement of lens module 26, single lens 32 functions as a field lens, and as such, bends light ray bundles at the edge of the field, which would otherwise miss doublet lens 34, back toward the longitudinal axis defined by the optical system to thereby minimize vignetting. This is a significant feature of the present invention in that the field of view may be increased without increasing the diameter of doublet 34.

Lens assemblies 28 of lens module 26 may be affixed to each other such that the lens module 26 is assembled as a single unit so as to facilitate mounting of the lens module 26 within the endoscope. As shown in FIG. 4, second lens 38 possesses a cylindrical flange extension 38a. In assembly, the flange extension of second lens 38 and the flange extension of each component 28 are aligned as shown in FIG. 3 and secured to each other by conventional adhesive means. The proper alignment of the flange extensions ensures the axial alignment of components 28 and 38 within the module.

Referring again to FIG. 3, the geometrical characteristics of module 26 are defined by an entrance image plane 40a, a front surface 40b, a first bonded surface 40c, a second bonded surface 40d, a third bonded surface 40e, a first inner surface 40f, a second inner surface 40g, a fourth bonded surface 40h, a fifth bonded surface 40i, a sixth bonded surface 40j, a rear surface 40k and an exit image plane 40l.

The geometrical and optical parameters of the module are recorded in Table 2. In Table 2, surfaces A, B-K and L correspond to image plane 40a, surfaces 40b-40k and exit image plane 40l, respectively. Table 2 is as follows:

TABLE 2

| SURFACE | RADIUS | THICK-NESS | ME-DIUM | INDEX | ABBE NO. |
| --- | --- | --- | --- | --- | --- |
| A | Image Plane | 3.0 ± .03 | Air | 1.000 | |
| B | 13.688 | 3.0 ± .03 | Acrylic | 1.492 | 57.4 |
| C | Plano | 44.0 ± .10 | SF2 | 1.648 | 33.9 |
| D | Plano | 3.0 ± .03 | Acrylic | 1.492 | 57.4 |
| E | −10.653 | 1.0 ± .03 | Polystyrene | 1.590 | 30.9 |
| F | −15.828 | 1.0 ± .03 | Air | 1.000 | |
| G | 15.828 | 1.0 ± .03 | Polystyrene | 1.590 | 30.9 |
| H | 10.653 | 3.0 ± .03 | Acrylic | 1.492 | 57.4 |
| I | Plano | 44.0 ± .10 | SF2 | 1.648 | 33.9 |
| J | Plano | 3.0 ± .03 | Acrylic | 1.492 | 57.4 |
| K | −13.688 | 3.0 ± .03 | Air | 1.000 | |
| L | Image Plane | | | | |

*dimensions are in millimeters

In a preferred embodiment, the relay lens assembly 14 comprises three lens modules 26 aligned in end to end fashion along a common axis as shown in FIG. 1. Preferably, the lens modules are interconnected by spacers 42 which may be secured to the flange extensions 32a (see FIG. 4) of single lenses 32. Interconnecting the modules is very desirable in that relay lens assembly 14 may be assembled as a single unit. This greatly facilitates mounting of the relay lens assembly within the endoscope. It is also within the scope of the present invention for relay lens assembly 14 to be secured to objective lens 12. Referring to FIG. 1, objective and relay lens assemblies may be attached with spacers 42, which may be secured to flange extension 24a of lens 24 (see FIG. 2A) and flange extension 32a of single lens 32 (see FIG. 4).

The relay lens system described in Table 2 provides an inexpensive relay lens assembly which furnishes a bright image to the viewer while also minimizing image aberrations. While many relay assemblies comprise as many as ten elements, there are only four elements in each lens module. The glass plano cylinders can be economically manufactured in large quantities. The polymeric lenses can be made with great precision and with economy of manufacture by known injection molding techniques.

Figure 5:
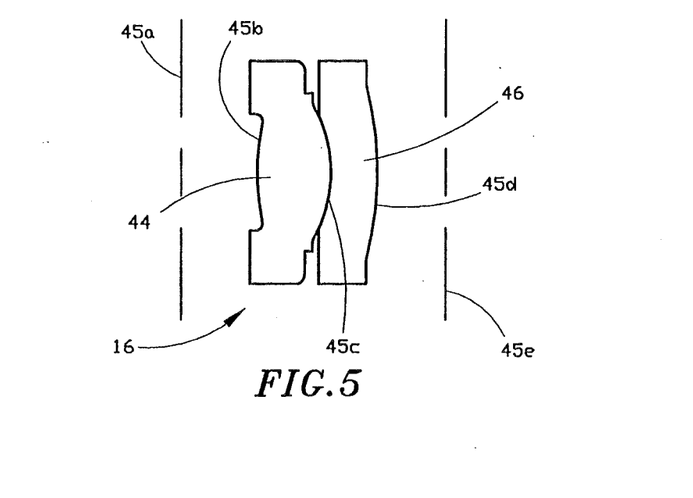
FIG. 5 is an enlarged optical schematic of an eye lens assembly of the optical system of FIG. 1.

Referring now to FIG. 5, the eye lens assembly 16 of optical system 10 is illustrated in detail. Eye lens assembly 16 includes a doublet lens having two polymeric lens elements 44, 46, which are bonded to each other along adjacent end surfaces. Preferably lens element 44 is a double convex lens and is fabricated from an acrylic while lens element 46 is a meniscus lens and is fabricated from a polystyrene. It is to be noted that lens elements 44 and 46 may be formed from other suitable materials including optical glass and crystal. The geometrical characteristics of eye lens assembly 16 are defined by entrance plane 45a, surface 45b-45d and exit pupil 45e. In normal use, the entrance pupil of the eye or a camera lens will be placed at exit pupil 45e. Table 3 below identifies the optical parameters of the eye lens assemblies.

TABLE 3

| SURFACE | RADIUS | THICK-NESS | ME-DIUM | INDEX | ABBE NO. |
| --- | --- | --- | --- | --- | --- |
| A | Image Plane | 18.1 ± .10 | Air | 1.000 | |
| B | 18.921 | 3.50 ± .10 | Acrylic | 1.492 | 57.4 |
| C | −5.986 | 1.0 ± .10 | Poly- | 1.590 | 30.9 |

TABLE 3-continued

| SUR-FACE | RADIUS | THICK-NESS | ME-DIUM | INDEX | ABBE NO. |
|---|---|---|---|---|---|
|  |  |  | styrene |  |  |
| D | −13.245 | 20.5 | Air | 1.000 |  |
| E | Exit Pupil |  |  |  |  |

*dimensions are in millimeters

Eye lens assembly 16 is axially aligned with objective lens assembly 12 and relay lens assembly 14 and may be mounted within a cavity defined in an eye piece assembly (not shown). Eye lens assembly 16 produces a magnified virtual image of the object for the viewer.

The optical system 10 of the present invention can be readily incorporated into conventional endoscopic instrumentation. Since the objective lens assembly and relay lens assembly may be secured to each other as a single unit, mounting of these components is greatly facilitated. Furthermore, the eye lens assembly may be readily secured within a cavity defined in an eye piece assembly. It is also to be noted that the optical system may include an illumination assembly (not shown) for illuminating the region to be viewed. Preferably, the illumination system incorporates fiber optic technology.

The optical system of the present invention is highly effective in transferring an illuminated image of an object to the viewer. In particular, the optical system produces exceptional results with regard to modulation transfer function (MTF), which is a useful parameter in evaluating the optical quality or performance of an image forming system. MTF also referred to as frequency response, sine-wave response or contrast transfer, is commonly defined as the ratio of the modulation in the image to that in the object as a function of the frequency (cycles per unit angle or length) of the sine-wave distribution pattern. A plot of modulation against frequency (angular frequency of the bars expressed as so many lines per degree in the image space) is an applicable measure of the performance of an imaging system. It should be noted that, for a given lens, the plot of MTF differs by wavelength, by field obliquity, by orientation of the bars, and from point to point along the lens axis.

Figure 6:
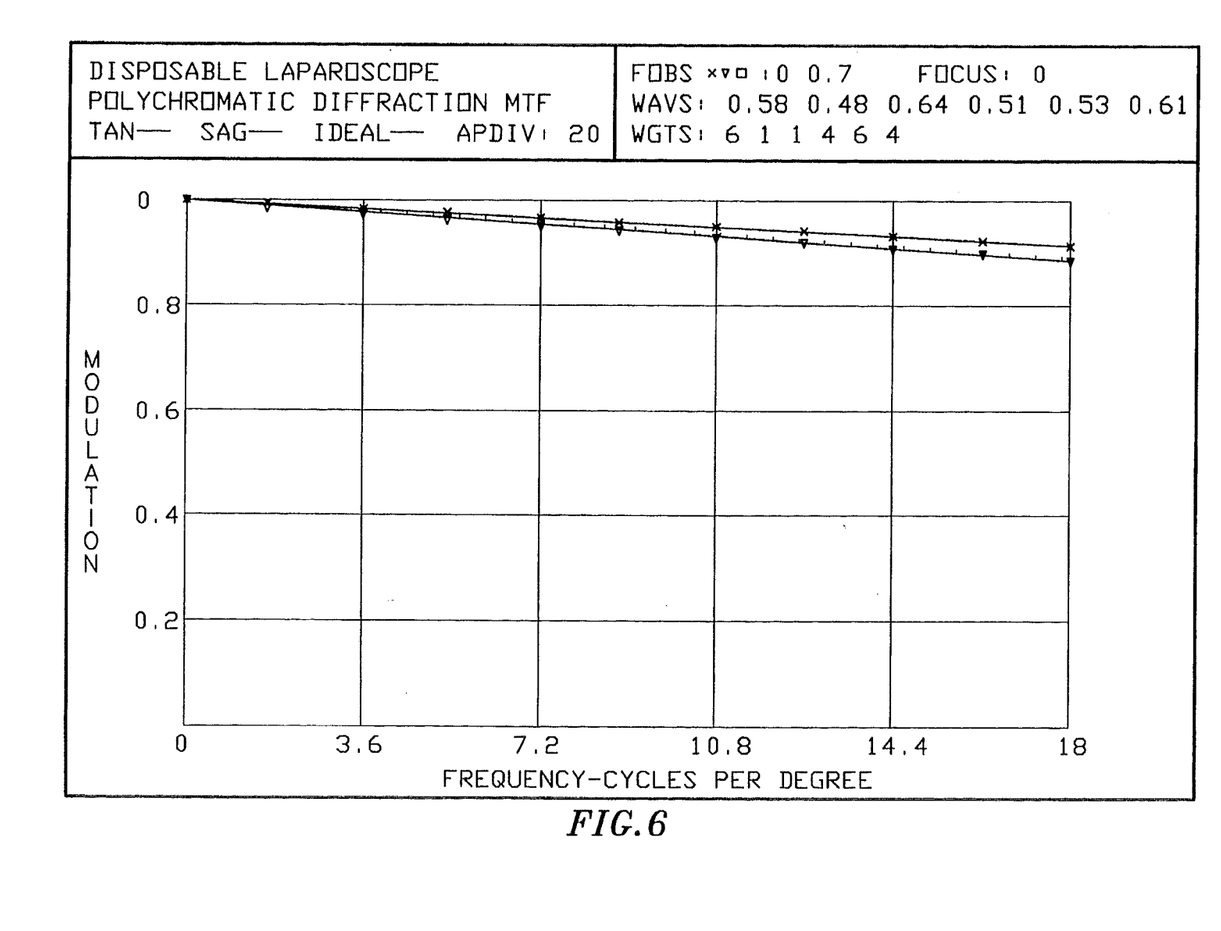
FIG. 6 is a graphic representation of modulation transfer function (MTF) curves for the optical system of FIG. 1.

FIG. 6 is a graph depicting MTF curves for the optical system of the present invention. MTF values were calculated along the lens axis and for points off the axis at 70% of the maximum angular field of view. As illustrated in the graph, the optical system has high modulation at the low spatial frequencies as well as the higher spatial frequencies for these points. Specifically, the modulation for the spatial frequencies ranging from 0 cycles/mm to 18 cycles/mm remains above 0.9 for points along the lens axis and for points off the axis at 70% of the maximum angular field of view. These modulation values are favorable when compared to conventional glass lens optical systems and indicate that the present optical system has theoretical optical resolution comparable to conventional glass lens optical systems.

While FIGS. 1-5 and Tables 1-3 provide a description of the preferred embodiment of the invention, various modifications, alternate construction materials, and equivalents may be employed without departing from the spirit of the invention. For example, in the relay lens assembly, the size of the air gap between optical components may be altered as well as the size and type of polymeric lenses incorporated in the module.

Figure 7:
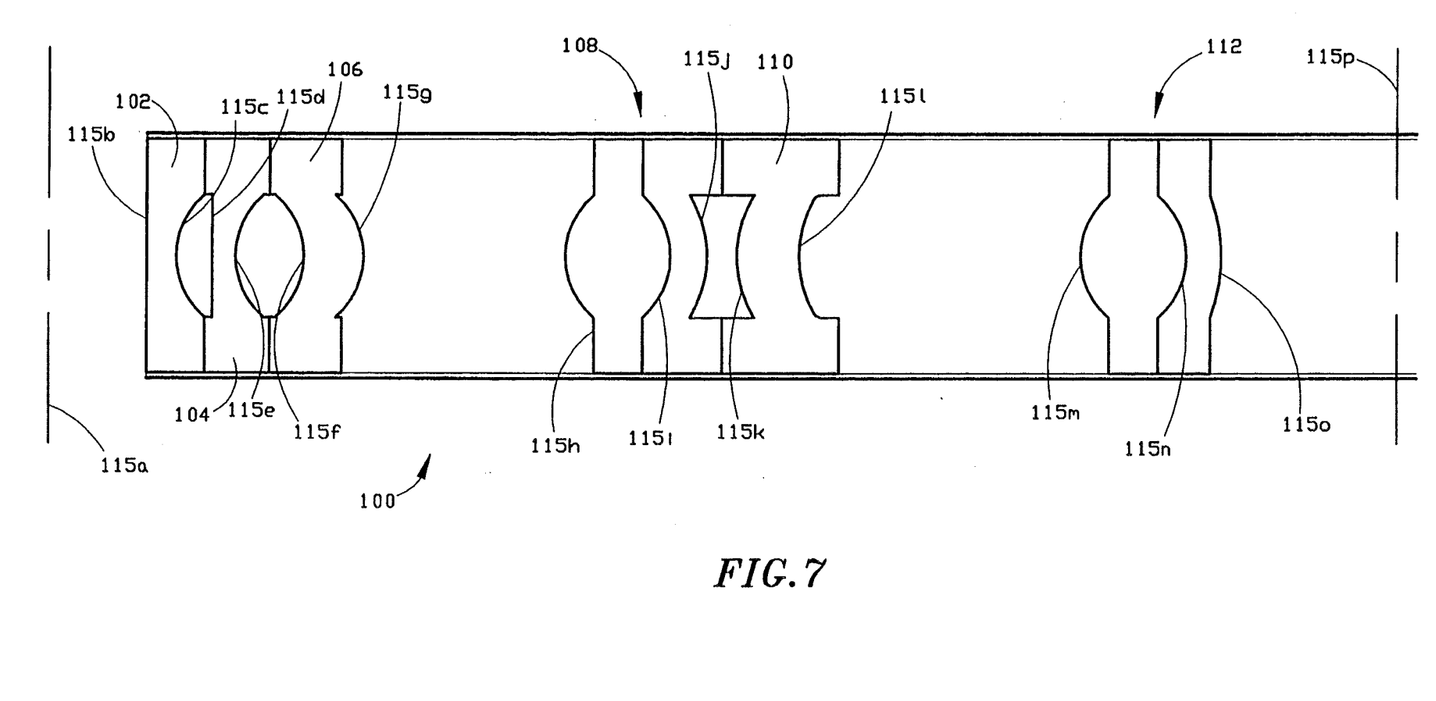
FIGS. 7, 8 and 9 are enlarged optical schematics of the objective lens, relay lens and eye lens assemblies, respectively, of another alternative embodiment of the endoscopic optical system of FIG. 1.
Figure 8:
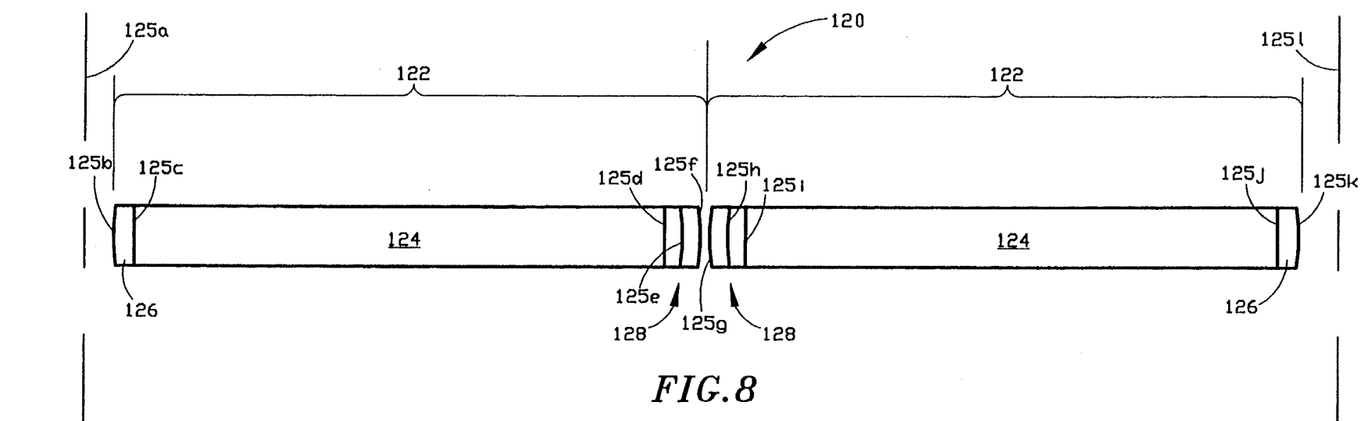
Figure 9:
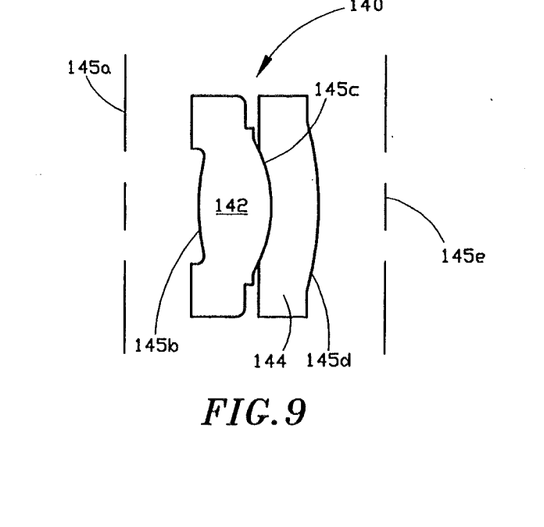

Referring now to FIGS. 7-9, there is illustrated another embodiment of the optical system of the present invention. FIG. 7 depicts the objective lens assembly 100 of the optical system while FIG. 8 shows the configuration of one lens module 120 of the relay lens system. FIG. 9 illustrates the eye lens assembly 140.

Referring initially to FIG. 7, objective lens assembly 100 includes a plurality of curved lenses 102, 104, 106, 108, 110 and 112 each being fabricated from a polymeric material, such as an acrylic, polystyrene, polycarbonate or copolymer styrene-acrylactide (SAN). In the preferred embodiment, lenses 102, 104 are both plano-concave lenses and are each fabricated from an acrylic. Lenses 108 and 112 are each doublet lenses. Lens elements 108a and 112a of doublets 108, 112 are each fabricated from acrylic while lens elements 108b and 112b are each fabricated from a polystyrene. Lenses 106 and 110 of the objective system are meniscus lenses with both lenses being fabricated from acrylic.

The geometrical characteristics of the objective lens assembly are defined by object plane 115a, surface planes 115b-115o and exit image plane 115p. The geometrical and optical parameters of objective lens assembly are recorded in Table 4 below.

TABLE 4

| SURFACE | RADIUS | THICK-NESS | MEDIUM | INDEX | ABBE NO. |
|---|---|---|---|---|---|
| A | Image Plane |  | Air | 1.000 |  |
| B | Plano | 1.1000 | Acrylic | 1.492 | 57.4 |
| C | 2.1000 | 0.9500 | Air |  |  |
| D | Plano | 1.0000 | Acrylic | 1.492 | 57.4 |
| E | 2.0000 | 1.0052 | Air | 1.000 |  |
| F | −4.1706 | 2.5971 | Acrylic | 1.492 | 57.4 |
| G | −2.6324 | 9.9876 | Air |  |  |
| H | 16.0841 | 2.5000 | Acrylic | 1.492 | 57.4 |
| I | −2.8165 | 1.0000 | Styrene | 1.590 | 30.9 |
| J | −8.2942 | 0.5241 | Air |  |  |
| K | 2.9956 | 2.4989 | Acrylic | 1.492 | 57.4 |
| L | 2.0000 | 9.9350 | Air |  |  |
| M | 8.1271 | 2.2500 | Acrylic | 1.492 | 57.4 |
| N | −5.2001 | 1.0000 | Styrene | 1.590 | 30.9 |
| O | −22.3952 | 4.0857 | Air |  |  |
| P | Image Plane |  |  |  |  |

FIG. 8 illustrates one lens module 120 of the relay lens system in detail. The relay lens system is substantially similar to the system disclosed in connection with the embodiment of FIG. 3 and includes at least one lens module 120 possessing a pair of identical lens assemblies 122. Each assembly 122 includes a glass plano cylinder 124 having a first curved polymeric lens 126 affixed to its first end surface and a curved doublet 128 affixed to its second end surface. The geometrical characteristics of module 120 are defined by entrance image plane 125a, intermediate surfaces 125b-125k and exit image plane 125l. The geometrical and optical parameters of this module are recorded in Table 5 below:

TABLE 5

| SUR-FACE | RADIUS | THICK-NESS | ME-DIUM | INDEX | ABBE NO. |
|---|---|---|---|---|---|
| A | Image Plane |  | Air | 1.000 |  |
| B | 14.7411 | 1.50 ± .03 | Acrylic | 1.492 | 57.4 |
| C | Plano | 44.0 ± .1 | F2 | 1.620 | 36.4 |
| D | Plano | 1.5 ± .03 | Acrylic | 1.492 | 57.4 |
| E | −10.060 | 1.0 ± .03 | Poly-styrene | 1.590 | 30.9 |
| F | −15.5477 | 1.0 ± .03 | Air | 1.000 |  |
| G | 15.5477 | 1.0 ± .03 | Poly- | 1.590 | 30.9 |

TABLE 5-continued

| SURFACE | RADIUS | THICKNESS | MEDIUM | INDEX | ABBE NO. |
|---|---|---|---|---|---|
| | | | styrene | | |
| H | 10.0600 | 1.5 ± .03 | Acrylic | 1.492 | 57.4 |
| I | Plano | 44.0 ± .10 | F2 | 1.620 | 36.4 |
| J | Plano | 1.5 ± .03 | Acrylic | 1.492 | 57.4 |
| K | −14.7411 | 4.0 | Air | 1.000 | |
| L | Image Plane | | | | |

*dimensions are in millimeters

Referring now to FIG. 9 the eye lens assembly 140 of the optical system is depicted and includes a curved doublet lens 142 having lens element 144 bonded to lens element 146. Lens 142 is fabricated from acrylic while lens 144 is fabricated from styrene. A field stop (not shown) may be provided at a distal end of the assembly to limit the size or angular extent of the object which the system will image. The geometric characteristics and optical parameters of the eye lens assembly 140 are recorded in Table 6 below.

TABLE 6

| SURFACE | RADIUS | THICKNESS | MEDIUM | INDEX | ABBE NO. |
|---|---|---|---|---|---|
| A | Image Plane | | Air | 1.000 | |
| B | 16.8460 | 3.5000 | Acrylic | 1.492 | 57.4 |
| C | −6.4000 | 1.000 | Styrene | 1.590 | 30.9 |
| D | −14.9405 | 22.0000 | Air | 1.000 | |
| E | Exit Pupil | | | | |

*dimensions are in millimeters

The optical system of this embodiment provides an effective, but, relatively inexpensive optical system that can be readily incorporated into endoscopic instrumentation. The polymeric lenses of the objective lens assemblies 100, relay lens assemblies 120 and eye lens assemblies 180 can be made with great precision and with economy of manufacture by known injection molding techniques.

To the extent not already indicated, it also will be understood by those of ordinary skill in the art that any one of various specific embodiments herein described and illustrated may be further modified to incorporate features shown in other of the specific embodiments.

The invention in its broader aspects therefor is not limited to the specific embodiments herein shown and described but departures may be made therefrom within the scope of the accompanying claims without departing from the principles of the invention and without sacrificing its chief advantages.

What is claimed is:

1. An optical system for an endoscope, which comprises:
   objective lens means for producing an image of an object at a first image plane;
   relay lens means comprising at least one relay lens module for relaying an image between successive image planes; and
   eye lens means for viewing an image formed at an exit image plane;
   wherein said at least one relay lens module is characterized by the following data:

| SURFACE | RADIUS | THICKNESS | MEDIUM | INDEX | ABBE NO. |
|---|---|---|---|---|---|
| A | Image Plane | 3.0 | Air | 1.000 | |
| B | 13.688 | 3.0 ± .03 | Acrylic | 1.492 | 57.4 |
| C | Plano | 44.0 ± .10 | F2 | 1.620 | 36.4 |
| D | Plano | 3.0 ± .03 | Acrylic | 1.492 | 57.4 |
| E | −10.653 | 1.0 ± .03 | Polystyrene | 1.590 | 30.9 |
| F | −15.828 | 1.0 ± .03 | Air | 1.000 | |
| G | 15.828 | 1.0 ± .03 | Polystyrene | 1.590 | 30.9 |
| H | 10.653 | 3.0 ± .03 | Acrylic | 1.492 | 57.4 |
| I | Plano | 44.0 ± .10 | F2 | 1.620 | 36.4 |
| J | Plano | 3.0 ± .03 | Acrylic | 1.492 | 57.4 |
| K | 13.688 | 3.0 | Air | 1.000 | |
| L | Image Plane | | | | |

*dimensions are in millimeters.

2. The optical system of claim 1, wherein said at least one relay lens module consists of, in succession, a first single lens, a first glass plano cylinder, a first doublet lens, a second doublet lens, a second glass plano cylinder and a second single lens, and wherein each of said first and second single lenses are affixed to respective first end surfaces of said first and second glass plano cylinders.

3. The optical system of claim 2, wherein each of said first and second doublet lenses are affixed to respective second end surfaces of said first and second glass plano cylinders.

4. The optical system of claim 1, wherein said relay lens means comprises three said relay lens modules.

5. The optical system of claim 1, wherein said objective lens means comprises a plurality of lenses, at least one of said lenses comprising a polymeric material selected from the group consisting of acrylics, polystyrenes, polycarbonates and styrene-acrylonitrile (SAN) copolymers.

6. The optical system of claim 5, wherein said objective lens means is characterized by the following data:

| SURFACE | RADIUS | THICKNESS | MEDIUM | INDEX | ABBE NO. |
|---|---|---|---|---|---|
| A | Object Plane | 25.0 | Air | 1.000 | |
| B | −1.553 | 2.50 ± .03 | Acrylic | 1.492 | 57.4 |
| C | −2.592 | 0.1 | Air | 1.000 | |
| D | 2.978 | 2.5 ± .03 | Acrylic | 1.492 | 57.4 |
| E | −3.738 | 1.0 ± .03 | Polystyrene | 1.590 | 30.9 |
| F | 3.738 | 2.25 ± .03 | Acrylic | 1.492 | 57.4 |
| G | −4.141 | 3.0 ± .03 | Air | 1.000 | |
| H | Image Plane | | | | |

*dimensions are in millimeters.

7. The optical system of claim 1, wherein said eye lens means comprises at least one lens, said at least one lens comprising a polymeric material selected from the group consisting of acrylics, polystyrenes, polycarbonates and styrene-acrylonitrile (SAN) copolymers.

8. The optical system of claim 7, wherein said eye lens means is characterized by the following data:

| SURFACE | RADIUS | THICKNESS | MEDIUM | INDEX | ABBE NO. |
|---|---|---|---|---|---|
| A | Image Plane | 18.1 | Air | 1.000 | |
| B | 18.921 | 3.50 ± .10 | Acrylic | 1.492 | 57.4 |
| C | −5.986 | 1.0 ± .10 | Polystyrene | 1.590 | 30.9 |
| D | −13.245 | 20.5 | Air | 1.000 | |

| SUR-FACE | RADIUS | THICK-NESS | ME-DIUM | INDEX | ABBE NO. |
|---|---|---|---|---|---|
| E | Exit Pupil | | | | |

*dimensions are in millimeters.

9. An optical system for an endoscope, which comprises:
   objective lens means for producing an image of an object at a first image plane;
   relay lens means comprising at least one relay lens module for relaying an image between successive image planes; and
   eye lens means for viewing an image formed at an exit image plane;
   wherein said at least one relay lens module is characterized by the following data:

| SUR-FACE | RADIUS | THICK-NESS | ME-DIUM | INDEX | ABBE NO. |
|---|---|---|---|---|---|
| A | Image Plane | | Air | 1.000 | |
| B | 14.7411 | 1.50 ± .03 | Acrylic | 1.492 | 57.4 |
| C | Plano | 44.0 ± .10 | F2 | 1.620 | 36.4 |
| D | Plano | 1.5 ± .03 | Acrylic | 1.492 | 57.4 |
| E | −10.060 | 1.0 ± .03 | Polystyrene | 1.590 | 30.9 |
| F | −15.5477 | 1.0 | Air | 1.000 | |
| G | 15.5477 | 1.0 ± .03 | Polystyrene | 1.590 | 30.9 |
| H | 10.0600 | 1.5 ± .03 | Acrylic | 1.492 | 57.4 |
| I | Plano | 44.0 ± .10 | F2 | 1.620 | 36.4 |
| J | Plano | 1.5 ± .03 | Acrylic | 1.492 | 57.4 |
| K | −14.7411 | 4.0 | Air | 1.000 | |
| L | Image Plane | | | | |

10. The optical system of claim 9, wherein said objective lens means comprises a plurality of lenses, at least one of said lenses comprising a polymeric material selected from the group consisting of acrylics, polystyrenes, polycarbonates and styrene-acrylonitrile (SAN) copolymers.

11. The optical system of claim 10, wherein said objective lens means is characterized by the following data:

| SURFACE | RADIUS | THICK-NESS | MEDIUM | INDEX | ABBE NO. |
|---|---|---|---|---|---|
| A | Image Plane | | Air | 1.000 | |
| B | Plano | 1.1000 | Acrylic | 1.492 | 57.4 |
| C | 2.1000 | 0.9500 | Air | | |
| D | Plano | 1.0000 | Acrylic | 1.492 | 57.4 |
| E | 2.0000 | 1.0052 | Air | 1.000 | |
| F | −4.1706 | 2.5971 | Acrylic | 1.492 | 57.4 |
| G | −2.6324 | 9.9876 | Air | | |
| H | 16.0841 | 2.5000 | Acrylic | 1.492 | 57.4 |
| I | −2.8165 | 1.0000 | Styrene | 1.590 | 30.9 |
| J | −8.2942 | 0.5241 | Air | | |
| K | 2.9956 | 2.4989 | Acrylic | 1.492 | 57.4 |
| L | 2.0000 | 9.9350 | Air | | |
| M | 8.1271 | 2.2500 | Acrylic | 1.492 | 57.4 |
| N | −5.2001 | 1.0000 | Styrene | 1.590 | 30.9 |
| O | −22.3952 | 4.0857 | Air | | |
| P | Image Plane | | | | |

*dimensions are in millimeters.

12. The optical system of claim 9, wherein said eye lens means comprises at least one lens, said at least one lens comprising a polymeric material selected from the group consisting of acrylics, polystyrenes, polycarbonates and styrene-acrylonitrile (SAN) copolymers.

13. The optical system of claim 12, wherein said eye lens means is characterized by the following data:

| SURFACE | RADIUS | THICK-NESS | MEDIUM | INDEX | ABBE NO. |
|---|---|---|---|---|---|
| A | Image Plane | | Air | 1.000 | |
| B | 16.8460 | 3.5000 | Acrylic | 1.492 | 57.4 |
| C | −6.4000 | 1.000 | Styrene | 1.590 | 30.9 |
| D | −14.9405 | 22.0000 | Air | 1.000 | |
| E | Exit Pupil | | | | |

*dimensions are in millimeters.

14. A relay lens system for an endoscope comprising at least one relay lens module for relaying an image between successive image planes, wherein said at least one relay lens module is characterized by the following dam:

| SUR-FACE | RADIUS | THICK-NESS | ME-DIUM | INDEX | ABBE NO. |
|---|---|---|---|---|---|
| A | Image Plane | 3.0 | Air | 1.000 | |
| B | 13.688 | 3.0 ± .03 | Acrylic | 1.492 | 57.4 |
| C | Plano | 44.0 ± .10 | SF2 | 1.648 | 33.9 |
| D | Plano | 3.0 ± .03 | Acrylic | 1.492 | 57.4 |
| E | −10.653 | 1.0 ± .03 | Polystyrene | 1.590 | 30.9 |
| F | −15.828 | 1.0 ± .03 | Air | 1.000 | |
| G | 15.828 | 1.0 ± .03 | Polystyrene | 1.590 | 30.9 |
| H | 10.653 | 3.0 ± .03 | Acrylic | 1.492 | 57.4 |
| I | Plano | 44.0 ± .10 | SF2 | 1.648 | 33.9 |
| J | Plano | 3.0 ± .03 | Acrylic | 1.492 | 57.4 |
| K | 13.688 | 3.0 ± .03 | Air | 1.000 | |
| L | Image Plane | | | | |

*dimensions are in millimeters.

* * * * *